United States Patent [19]

Bearcroft

[11] 4,446,744

[45] May 8, 1984

[54] ULTRASONIC FLOWMETER

[75] Inventor: Kenneth E. Bearcroft, Lichfield, England

[73] Assignee: ITT Industries, Incorporated, New York, N.Y.

[21] Appl. No.: 329,524

[22] Filed: Dec. 10, 1981

[30] Foreign Application Priority Data

Jan. 23, 1981 [GB] United Kingdom ............... 8102152

[51] Int. Cl.³ .............................................. G01F 1/66
[52] U.S. Cl. ................................ 73/861.28; 73/861.29
[58] Field of Search ........... 73/861.27, 861.28, 861.29, 73/861.31

[56] References Cited

U.S. PATENT DOCUMENTS

| 2,912,856 | 11/1959 | Kritz | 73/861.29 |
| 3,007,339 | 11/1961 | Hill | 73/861.28 |
| 4,069,713 | 1/1978 | Gassmann | 73/861.28 |

FOREIGN PATENT DOCUMENTS 673852  7/1979  U.S.S.R. ........................... 73/861.31

OTHER PUBLICATIONS

J. L. McShane, "Flow, Its Measurement and Control in Science & Industry", vol. 1, Part II, 1974, pp. 897–913.
Lynch et al.–"Flow Measurement with a New Ultrasonic Flowmeter"–Flow, Its Measurement and Control in Science & Industry, vol. 1, Part II, 1974, pp. 925–931.

Primary Examiner—Charles A. Ruehl
Attorney, Agent, or Firm—T. E. Kristofferson; A. D. Stolzy

[57] ABSTRACT

An ultrasonic flowmeter arrangement has a pair of electroacoustic transmit/receive transducers located in opposite walls of a pipe, the transducers being longitudinally displaced and facing one another, thus forming a bidirectional transmission path oblique to the direction of fluid flow in the pipe. Each transducer is driven by a voltage controlled oscillator operating sometimes at nominally the same frequency. In one case the oscillator outputs are divided down separately to provide two different transmission frequencies. Filters apply to phase comparison means corresponding transmitted and received frequencies. The outputs of the phase comparison means provide feedback control signals for the oscillators. The oscillator outputs are fed to a mixing means to derive a difference frequency signal as a measure of the rate of fluid flow in the pipe.

3 Claims, 2 Drawing Figures

ULTRASONIC FLOWMETER

BACKGROUND OF THE INVENTION

This invention relates to flowmeters and, more particularly, to an ultrasonic flowmeter.

PRIOR ART STATEMENT

One of the difficulties involved in the measurement of fluid flow by ultrasonic techniques is that of overcoming transient variations in the fluid continuum, such variations being attributable to, e.g. suspended solids, entrained gas bubbles, rapid changes in density, flow rate and the presence of eddies in the fluid arising from turbulence effects. It is therefore necessary to employ a flow measuring instrument which is relatively insensitive to such transient effects.

In the case of liquid flowmeters these difficulties have been overcome by the use of nearly simultaneous sonic pulse transmission techniques in which an upstream and a downstream sonic pulse are transmitted through substantially the same portion of the fluid, thus providing automatic compensation for any transient variation in the fluid flow. Techniques of this type are described in Bearcroft et al. U.K. No. 1551220 filed Nov. 20, 1975. Such techniques, however, cannot always be applied to the measurement of gas flow for a number of reasons. Thus, the necessarily high sonic frequencies, e.g., above 1 MHz, cannot be employed. The upper limit for transmission in gas is of the order of 100 KHz. This lower frequency increases the problem of resolving transmission time differences. Also, at those lower frequencies the sonic transducers tend to suffer from ringing unless excessive damping is applied.

There is considerable art prior to the present invention, much of which will be found in Subclass 194 A, Class 73 of the U.S. Patent and Trademark Office Manual of Classification.

Perhaps more pertinent prior art includes U.S. Pat. No. 4,069,713 issued Jan. 24, 1978, in which two voltage controlled oscillators are employed.

SUMMARY OF THE INVENTION

In accordance with the flowmeter of the present invention, two transmitting and receiving transducers are operated simultaneously at different frequencies or on a time shared basis.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
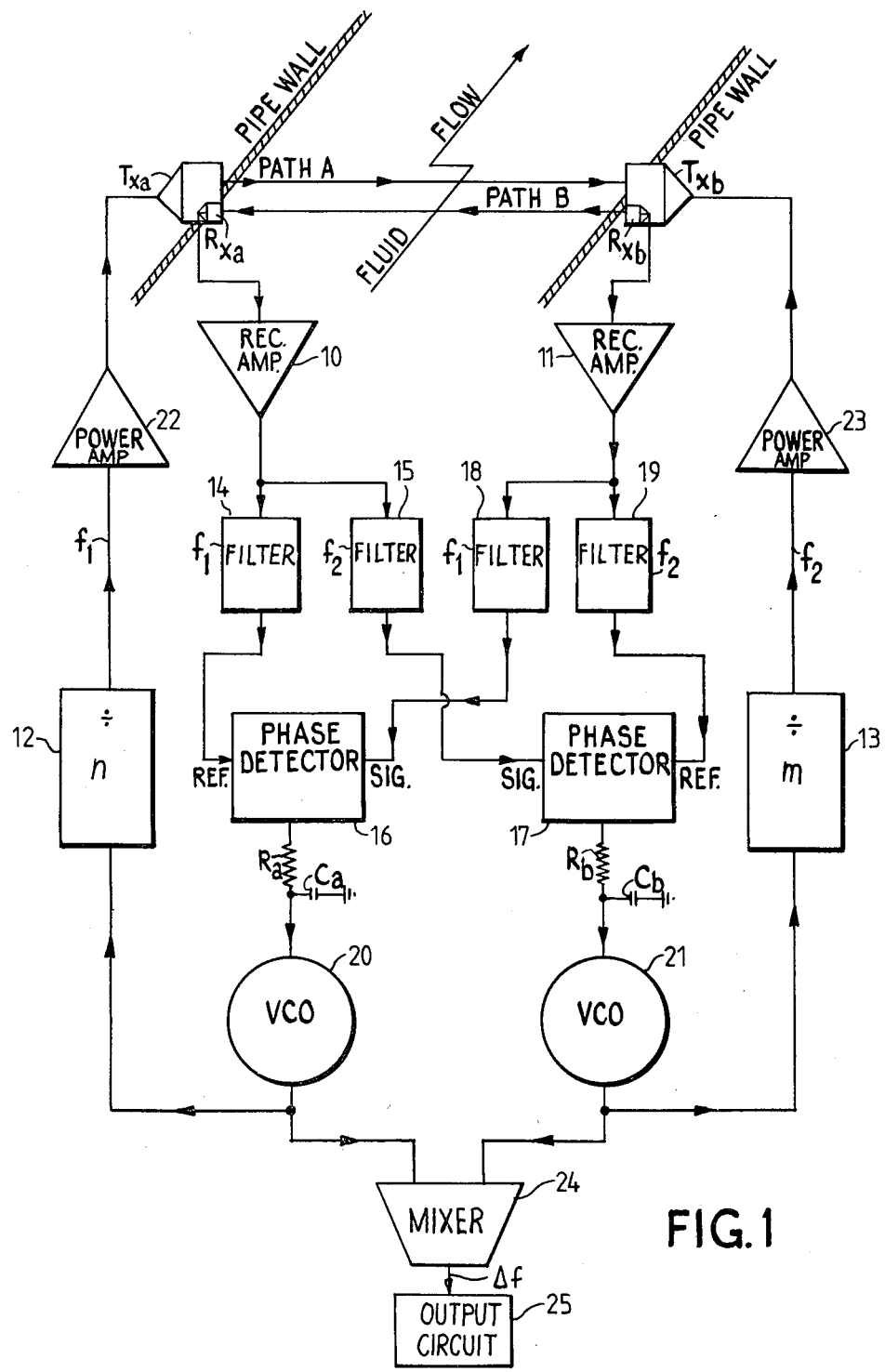
FIG. 1 is a block diagram of a flowmeter constructed according to the present invention.

For further background hereto, see said Bearcroft et al. patent. For example, in FIG. 1 hereof transmitting tranducers are illustrated at $T_{xa}$ and $T_{xb}$. Receiving transducers are illustrated at $R_{xa}$ and $R_{xb}$. Receiving amplifiers 10 and 11 are connected from transducers $R_{xa}$ and $R_{xb}$, respectively.

Frequencies $f_1$ and $f_2$ will generally be very close to each other although frequency dividers 12 and 13 may divide by n and m, respectively.

Filters 14 and 15 are connected from amplifier 10 to phase detectors 16 and 17, respectively.

Filters 18 and 19 are again connected from amplifier 11 to phase detectors 16 and 17, respectively.

The output of phase detector 16 is connected to a voltage controlled oscillator (VCO) 20 via a smoothing circuit including a resistor $R_a$ and a capacitor $C_a$.

The output of phase detector 17 is connected to a VCO 21 via a smoothing circuit including a resistor $R_b$ and a capacitor $C_b$.

The outputs of VCO's 20 and 21 are divided down by dividers 12 and 13, respectively. The outputs of dividers 12 and 13 are respectively connected to transducers $T_{xa}$ and $T_{xb}$ via power amplifiers 22 and 23, respectively.

The difference between the output frequencies of VCO's 20 and 21 is produced at the output of a mixer 24. An output circuit 25 is connected from mixer 24. Circuit 25 may include a frequency meter claibrated in units of volume per unit time.

OPERATION

Vibration is transmitted over paths A and B simultaneously. The frequencies of VCO 20 and VCO 21 are changed automatically, such that, as is known, with the lengths of paths A and B equal to S, $$f_1 - f_2 = 2v/S \qquad (1)$$

where $v$ is the linear velocity of the fluid.
Thus, $$v = (S/2)(f_1 - f_2) \qquad (2)$$

Previous developments are known in the art. See the said Bearcroft et al. patent.

Mixer 24 produces an output signal of a frequency $(f_1 - f_2)$. Output circuit 25 may be a frequency meter calibrated in volume per unit time.

Each reciving transducer $R_{xa}$ and $R_{xb}$ receives part of its own transmitting transducer $T_{xa}$ and $T_{xb}$, respectively, and the output propagated by transducers $T_{xb}$ and $T_{xa}$, respectively.

Figure 2:
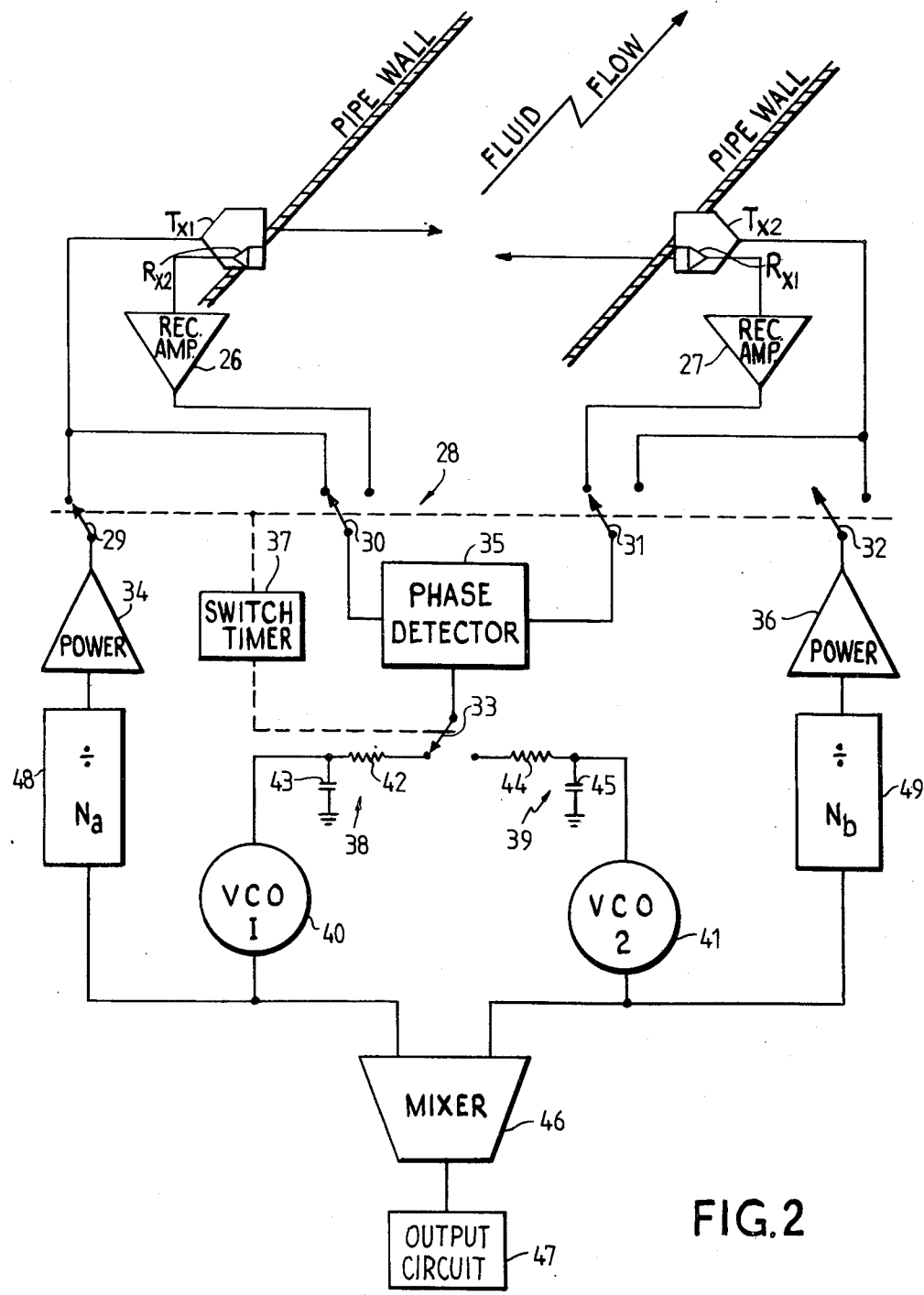
FIG. 2 is a block diagram of an alternative embodiment of the invention.

As an alternative to the frequency discrimination of the continuously transmitted acoustic signals, a form of pulsed operation may be used as shown in FIG. 2 to achieve time discrimination between the signals. The same frequency is used for both paths but transmission is in bursts or pulses of acoustic signal, each transmitter burst ceasing before receipt of the corresponding burst from the other transmitter. The filters are not now required but a simple switched circuit is needed to hold the reference frequency of each transmitted pulse until the propagated acoustic signal is received from the other transducer.

One advantage of the invention is that being symmetrical in circuit design the transducers can be switched over between the two phase locked loop circuits to remove drift effects. When the frequency discrimination embodiment is used, both phase locked loops run continuously and thus the system can work under conditions of rapid changes of density, temperature and pressure, such as are liable to occur in gas pipes. The use of carrier wave transmissions also results in a high noise immunity. Changes in pipe diameter are most easily dealt with by a suitable choice of division factors in the dividers.

In FIG. 2, a transmitting transducer $T_{x1}$ is shown, as before. Also shown is a transmitting transducer $T_{x2}$.

Corresponding receiving transducers are shown at $R_{x1}$ and $R_{x2}$.

A receiving amplifier 26 is connected from receiving transducer $R_{x2}$. A receiving amplifier 27 is connected from receiving transducer $R_{x1}$. A ganged switch is provided at 28 having poles 29, 30, 31, 32 and 33.

Ganged pole 29 alternately connects the output of a power amplifier 34 to transmitting transducer $T_{x1}$. Pole 30 connects the output of amplifier 26 to a phase detector 35. Alternately, pole 30 corrects the input of phase detector 35 to the output of power amplifier 34 via pole 29.

Pole 32 similarly connects another input to phase detector 35 from amplifier 27 or the output of power amplifier 36 via pole 32.

A switch timer 37 operates poles 29 through 33, inclusive.

Pole 32 connects the output of power amplifier 36 to the transmitting transducer $T_{x2}$.

Pole 33 connects the output of phase detector 35 alternately to input circuits 38 and 39 to voltage controlled oscillator (VCO) 40, and to VCO 41. Circuit 38 includes a resistor 42 and a capacitor 43. Circuit 39 includes a resistor 44 and a capacitor 45.

The outputs of VCO 40 and VCO 41 are impressed upon a mixer 46 that is connected to an output circuit 47, as before. The output of VCO 40 is also passed through a frequency divider 48 to power amplifier 34. Similarly, some of the output of VCO 41 is impressed upon power amplifier 36 via a frequency divider 49.

In operation, VCO is corrected in frequency, the alternately VCO 41 is corrected in frequency.

As may be supposed $$\Delta f = f_1 - f_2 \tag{3}$$

Switch timer 37 in FIG. 2 is essentially a clock.

In FIG. 1 n may be different from m.

What is claimed is:

1. A flowmeter comprising: a pipe section having an axis and a first transmitting transducer at one location on said pipe section to transmit vibrational energy in a line approximately through said axis at an acute angle relative thereto; a first receiving transducer at a second location on said pipe section approximately on said line facing said first transducer; a second transmitting transducer at said second location approximately on said line; a second receiving transducer at said first location facing said second transmitting transducer; first and second receiving amplifiers connected from said first and second receiving transducers, respectively; first and second filters connected from said first receiving amplifier to pass frequencies $f_1$ and $f_2$, respectively; third and fourth filters connected from said second receiving amplifier to pass frequencies $f_1$ and $f_2$, respectively; a first voltage controlled oscillator (VCO); a first phase detector connected from said first and third filters to said first VCO; a second VCO; a second phase detector connected from said second and fourth filters to said second VCO; first and second power amplifiers connected to said first and second transmitting transducers, respectively; a first frequency divider of divisor n connected from said first VCO to said first power amplifier; second frequency divider of divisor m connected from said second VCO to said second power amplifier; difference means responsive to the output of said first and second VCO's for producing a main signal proportional to the difference between the output frequencies of said first and second VCO's; and an output circuit connected from said difference means to produce an indication of the magnitude of said main signal.

2. The invention as defined in claim 1, wherein said indication of the magnitude of said main signal is in units of volume per unit time.

3. A flowmeter comprising: a pipe section having an axis and a first transmitting transducer at one location on said pipe section to transmit vibrational energy in a line approximately through said axis at an acute angle relative thereto; a first receiving transducer at a second location on said pipe section approximately on said line facing said first transducer; a second transmitting transducer at said second location approximately on said line; a second receiving transducer at said first location facing said second transmitting transducer; first and second receiving amplifiers connected from said first and second receiving transducers, respectively; a first voltage controlled oscillator (VCO); a second VCO; first and second power amplifiers connected from first and second VCO's, respectively; a phrase detector having first and second inputs and an output; first, second, third, fourth and fifth switches; a switch timer to operate said switches synchronously, said first switch alternately connecting and disconnecting said first power amplifier from said first transmitting transducer while the remainder of said switches are in first and second positions, respectively, said second switch being connected to one phase detector input alternately from said first transmitting transducer and said second receiving amplifier in said first and second positions, respectively, said third switch connecting the other input of said phase detector alternately to said first receiving amplifier and to said second transmitting transducer in said first and second positions, respectively, said fourth switch alternately disconnecting and connecting said second power amplifier from said second transmitting transducer in said first and second positions, respectively, said fifth switch connecting the output of said phase detector alternately to said first and second VCO's when in said first and second positions, respectively; difference means responsive to the output of said first and second VCO's for producing a main signal proportional to the difference between the output frequencies of said first and second VCO's; and an output circuit connected from said difference means to produce an indication of the magnitude of said main signal.

* * * * *